(12) United States Patent
Lee et al.

(10) Patent No.: US 9,645,456 B2
(45) Date of Patent: May 9, 2017

(54) LIQUID CRYSTAL DISPLAY

(71) Applicant: Samsung Display Co., Ltd., Yongin, Gyeonggi-Do (KR)

(72) Inventors: Dae Young Lee, Seoul (KR); Dae Hwan Jang, Seoul (KR); Eun Jung Kim, Suwon-si (KR); Jung Gun Nam, Suwon-si (KR); Moon Jung An, Hwaseong-si (KR); Joo Hyung Lee, Seongnam-si (KR); Gug Rae Jo, Asan-si (KR); Hyung Bin Cho, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 93 days.

(21) Appl. No.: 14/681,608

(22) Filed: Apr. 8, 2015

(65) Prior Publication Data

US 2016/0202550 A1 Jul. 14, 2016

(30) Foreign Application Priority Data

Jan. 8, 2015 (KR) ........................ 10-2015-0002548

(51) Int. Cl.
*G02F 1/1345* (2006.01)
*G02F 1/1335* (2006.01)

(52) U.S. Cl.
CPC ............ *G02F 1/13452* (2013.01); *G02F 2001/133548* (2013.01)

(58) Field of Classification Search
CPC ..... G02F 2001/133548; G02F 1/13458; G02F 1/133345
See application file for complete search history.

(56) References Cited

U.S. PATENT DOCUMENTS

| | | | |
|---|---|---|---|
| 6,243,199 B1 | 6/2001 | Hansen et al. | |
| 9,365,933 B2* | 6/2016 | Son | H01L 21/0337 |
| 9,383,601 B2* | 7/2016 | Lee | G02F 1/133528 |
| 2005/0179849 A1* | 8/2005 | Nomura | G02F 1/1345 349/149 |
| 2005/0243234 A1* | 11/2005 | Jung | G02F 1/13452 349/43 |
| 2013/0033662 A1* | 2/2013 | Chung | G02F 1/133528 349/96 |
| 2014/0293187 A1* | 10/2014 | Nam | G02F 1/13362 349/62 |

FOREIGN PATENT DOCUMENTS

| | | |
|---|---|---|
| JP | 2008-197757 | 8/2008 |
| JP | 2013-200339 | 10/2013 |
| KR | 1020090012115 A | 2/2009 |

* cited by examiner

*Primary Examiner* — Dennis Y Kim
(74) *Attorney, Agent, or Firm* — Innovation Counsel LLP (57) ABSTRACT

Provided are a liquid crystal display (LCD) comprising: a first substrate; a second substrate which faces the first substrate; a liquid crystal layer which is disposed between the first substrate and the second substrate; a wire grid polarizer (WGP) which is disposed on the first substrate; a WGP insulating layer which is disposed on the WGP and covers the WGP; and a pad electrode which is disposed on the first substrate, wherein the first substrate comprises a non-overlap area protruding from the second substrate, a sidewall of the WGP insulating layer is located in the non-overlap area, and the pad electrode extends from the non-overlap area of the first substrate along the sidewall of the WGP insulating layer.

20 Claims, 8 Drawing Sheets

LIQUID CRYSTAL DISPLAY

This application claims priority from Korean Patent Application No. 10-2015-0002548 filed on Jan. 8, 2015 in the Korean Intellectual Property Office, the disclosure of which is incorporated herein by reference in its entirety.

BACKGROUND

1. Field

The present application relates to a liquid crystal display (LCD), and more particularly, to an LCD including a liquid crystal layer interposed between display substrates.

2. Description of the Related Art

Liquid crystal displays (LCDs) are one of the most widely used types of flat panel displays. Generally, an LCD includes a pair of display substrates having electric field generating electrodes such as pixel electrodes and a common electrode and a liquid crystal layer interposed between the display substrates. The LCD generates an electric field in the liquid crystal layer by applying voltages to the electric field generating electrodes. Accordingly, the alignment of liquid crystal molecules of the liquid crystal layer is determined, and polarization of incident light is controlled. As a result, an image is displayed on the LCD.

In the LCD, a polarizing plate is attached to an outer surface of each of the two display substrates having the electric field generating electrodes in order to adjust polarization of incident light. The polarizing plate is an absorptive polarizing plate that absorbs all light excluding light of a desired polarization. Due the polarizing plate, only a very small portion of a light source which supplies light to the LCD can be used to display an image. Accordingly, this reduces the light efficiency of the light source of the LCD.

To improve the light efficiency of the light source of the LCD, a wire grid polarizer (WGP) is formed using a nanoimprint method.

The WGP is an optical device that extracts linearly polarized light having a specific oscillation direction from unpolarized light such as natural light. That is, when a period of the arrangement of metal wires is shorter than a half wavelength of an incident electromagnetic wave, a polarization component (S wave) parallel to the metal wires is reflected, and a polarization component (P wave) perpendicular to the metal wires is transmitted. Using this phenomenon, a planar polarizer having superior polarization efficiency, high transmittance, and a wide viewing angle can he manufactured. Here, the planar polarizer is called a WGP.

If the WGP is applied to a thin-film transistor (TFT) backplane, a luminance improvement effect can he obtained due to a recycling effect for S waves. However, the WGP typically made of a metal material may affect characteristics of a TFT formed thereon. To prevent this problem, a TFT process begins after a WGP insulating layer is formed. However, since a metal wiring line is formed on the WGP insulating layer, a defect may occur in a pad portion due to an adhesion problem.

SUMMARY

Aspects of the inventive concept provide a liquid crystal display (LCD) which can prevent a wiring defect in a pad portion of a display panel having a wire grid polarizer (WGP).

However, aspects of the inventive concept are not restricted to the one set forth herein. The above and other aspects of the inventive concept will become more apparent to one of ordinary skill in the art to which the present application pertains by referencing the detailed description given below.

According to an aspect of the inventive concept, there is provided a liquid crystal display (LCD) comprising: a first substrate; a second substrate which faces the first substrate; a liquid crystal layer which is disposed between the first substrate and the second substrate; a wire grid polarizer (WGP) which is disposed on the first substrate; a WGP insulating layer which is disposed on the WGP and covers the WGP; and a pad electrode which is disposed on the first substrate, wherein the first substrate comprises a non-overlap area protruding from the second substrate, a sidewall of the WGP insulating layer is located in the non-overlap area, and the pad electrode extends from the non-overlap area of the first substrate along the sidewall of the WGP insulating layer.

The pad electrode may further extend from the sidewall of the WGP insulating layer onto the WGP.

Each of the first substrate and the second substrate may include a display area having a plurality of pixels and a non-display area located around the display area.

The LCD may further comprise a reflective layer which is disposed on the first substrate, wherein the reflective layer may be located on the same layer as the WGP.

The WGP may be located in the display area, and the reflective layer may be located in the non-display area.

The reflective layer may further be located in the display area.

The LCD may further comprise a black matrix and a color filter which are disposed on the second substrate, wherein the black matrix may be disposed along boundaries of the pixels, the color filter may be disposed in each of the pixels, and the reflective layer may be overlapped by the black matrix in the display area.

The pad electrode may be located on the first substrate via a step portion of the WGP insulating layer.

The step portion may slope at a predetermined angle.

The step portion may have an angle of 45 to 80 degrees to the first substrate.

The LCD may further comprise a flexible printed circuit board (FPCB) connected to a pad portion, wherein the FPCB may be thermo-compression bonded to the pad portion by an anisotropic conductive film disposed on the first substrate.

The LCD may further comprise a flexible printed circuit board (FPCB) connected to a pad portion, wherein the FPCB may be thermo-compression bonded by an anisotropic conductive film disposed on the first substrate.

The second substrate may include a display area configured to display an image and a non-display area excluding the display area, wherein the WGP is included in the display area.

A reflective layer may be formed in the non-display area.

The reflective layer may contain aluminum.

The WGP may be shaped like a plurality of stripes extending along a direction when the first substrate is seen in plan view.

The WGP may contain any one or more of aluminum, gold, silver, copper, chrome, iron, nickel, molybdenum, and alloys thereof.

A pad portion may comprise a gate pad portion connected to gate lines and a data pad portion connected to data lines, wherein gate signal lines of the gate pad portion and data signal lines of the data pad portion are formed not only on the WGP insulating layer but also on the first substrate.

Each of the gate signal lines and the data signal lines may be located on the first substrate via a step portion of the WGP insulating layer.

The LCD may further comprise a flexible printed circuit board (FPCB) which is connected to the gate signal lines and the data signal lines disposed on a portion of the first substrate exposed by the WGP insulating layer.

BRIEF DESCRIPTION OF THE DRAWINGS

The above and other aspects and features of the inventive concept will become more apparent by describing in detail exemplary embodiments thereof with reference to the attached drawings, in which.

DETAILED DESCRIPTION

Features of the inventive concept and methods of accomplishing the same may be understood more readily by reference to the following detailed description of preferred embodiments and the accompanying drawings. The inventive concept may, however, be embodied in many different forms and should not he construed as being limited to the embodiments set forth herein. Rather, these embodiments are provided so that this disclosure will be thorough and complete and will fully convey the concept of the inventive concept to those skilled in the art, and the inventive concept will only be defined by the appended claims.

In the drawings, the thickness of layers and regions are exaggerated for clarity. As used herein, the term "and/or" includes any and all combinations of one or more of the associated listed items.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the inventive concept.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Exemplary embodiments will hereinafter be described with reference to the accompanying drawings.

Figure 1:
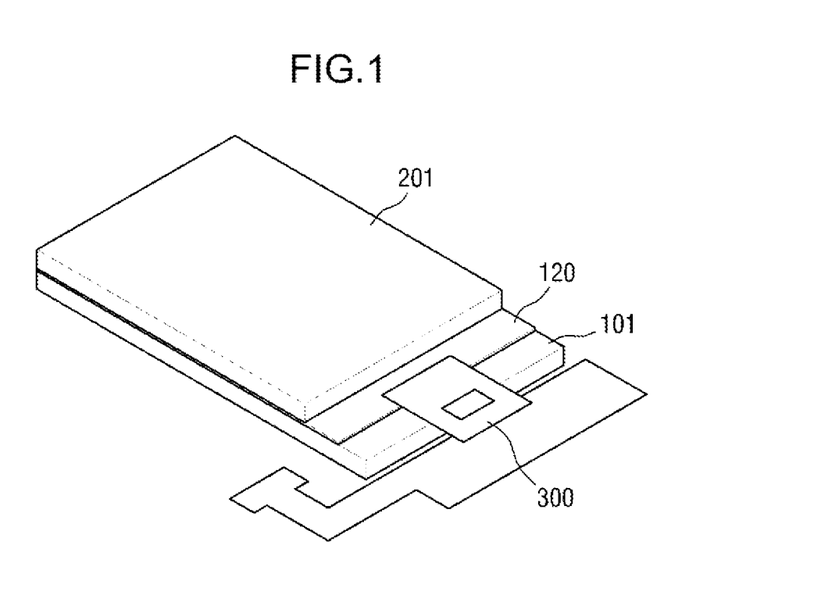
FIG. 1 is a perspective view of a display panel of a liquid crystal display (LCD) according to a first embodiment and a flexible printed circuit board (FPCB) connected to the display panel.
Figure 2:
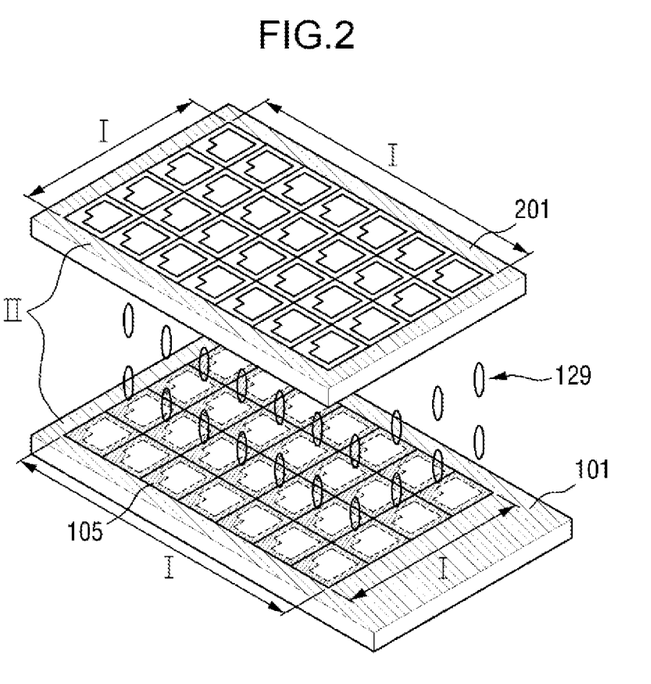
FIG. 2 is an exploded perspective view of the display panel of the LCD according to the first embodiment.

FIG. 1 is a perspective view of a liquid crystal display (LCD) according to a first embodiment. FIG. 2 is an exploded perspective view of a display panel of the LCD illustrated in FIG. 1.

Referring to FIGS. 1 and 2, the LCD may include the display panel and a flexible printed circuit board (FPCB) 300 on which circuits for transmitting driving signals to the display panel are mounted.

The display panel includes a first substrate 101, a second substrate 201, and a liquid crystal layer 129 located between the first substrate 101 and the second substrate 201.

The display panel includes a display area I and a non-display area IL The display area I is an area where an image is displayed and includes a plurality of pixels. The pixels may be arranged in a matrix. The non-display area II is located around the display area I. The non-display area II may form a bezel portion of the display panel.

The first substrate 101 may be larger than the second substrate 201. Thus, the first substrate 101 may include an area which is not overlapped by the second substrate 201 and protrudes from a side of the second substrate 201. The non-overlap area III (see FIG. 3) of the first substrate 101 may correspond to the non-display area II, and the FPCB 300 may be attached to the non-overlap area III of the first substrate 101.

The above LCD will now be described in greater detail.

Figure 3:
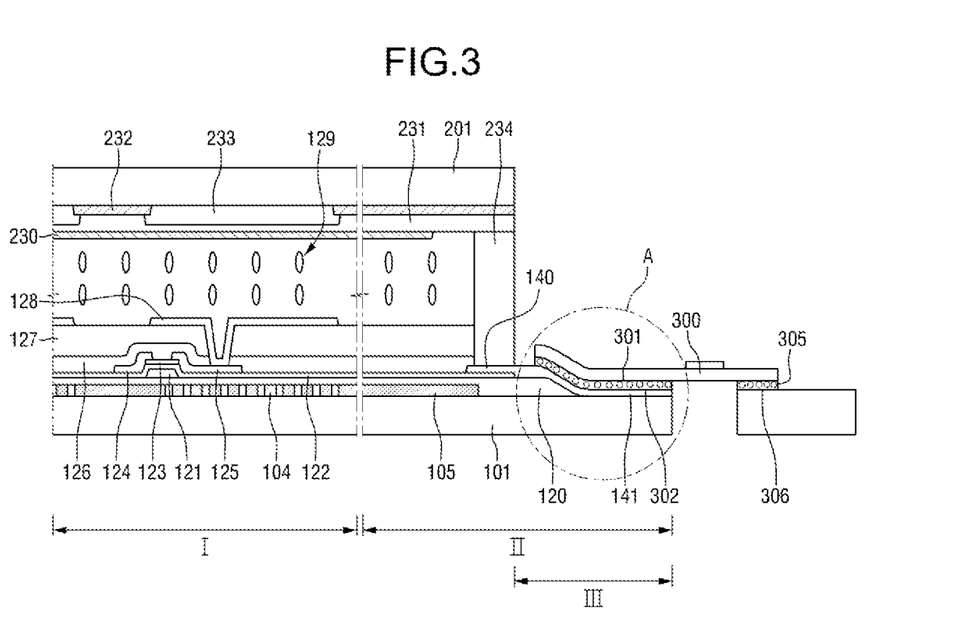
FIG. 3 is a cross-sectional view of the display panel of the LCD according to the first embodiment.

FIG. 3 is a cross-sectional view of the LCD according to the first embodiment.

Referring to FIG. 3. the first substrate 101 may be a transparent insulating substrate made of glass or transparent plastic.

A wire grid polarizer (WGP) 104 and a reflective layer 105 are disposed on the first substrate 101. The WGP 104 and the reflective layer 105 may be located on the same layer. The WGP 104 may be disposed in the display area I of the first substrate 101, and the reflective layer 105 may be disposed in the non-display area II of the first substrate 101.

In some embodiments, the reflective layer 105 may also be disposed in the display area I of the first substrate 101. In this case, the WGP 104 may be overlapped by a pixel electrode 128, and the reflective layer 105 may be located in an area (e.g., a wiring or thin-film transistor (TFT) area) in which the pixel electrode 128 is not formed.

The WGP 104 may consist of fine metal wires arranged regularly and parallel to each other along a direction. That is, the WGP 104 may be shaped like a plurality of stripes extending along a direction when the first substrate 101 is seen in plan view.

The direction in which the fine metal wires are arranged may be a direction parallel, perpendicular, or oblique to gate lines.

The WGP 104 may have a line width and interval smaller than red, green and blue wavelengths in a visible light region. For example, the line width and interval of the WGP 104 may be in a range of 50 to 200 nm which is smaller than a blue region, i.e., a lowest optical wavelength of visible light.

Light propagates while oscillating in directions horizontal and vertical to a direction in which the light propagates. Therefore, when light emitted from a backlight unit (not shown) enters the WGP 104, a portion of the light which is incident parallel to spaces between the fine metal wires may pass through the WGP 104, but the other portions may be reflected by the fine metal wires. That is, P-polarized light transmits through the WGP 104, but S-polarized light fails to transmit through the WGP 104 and is reflected by the WGP 104. The reflected light may enter the backlight unit below to be reused.

The fine metal wires that constitute the WGP 104 may contain metal with high reflectivity. For example, the WGP 104 may contain any one of aluminum, gold, silver, copper, palladium, platinum, rhodium, silicon, cobalt, manganese, titanium, ruthenium, niobium, neodymium, ytterbium, yttrium, tungsten, indium, bismuth, chrome, iron, nickel, molybdenum, and alloys thereof. In addition, the WGP 104 may be a single layer made of any one of the above metals and alloys or a multilayer made of two or more of the above metals and alloys. For example, the WGP 104 may be a double layer consisting of a lower aluminum layer and an upper titanium layer or a lower aluminum layer and an upper molybdenum layer.

The reflective layer 105 is formed on the first substrate 101 in the non-display area II. In the display area I, the reflective layer 105 is disposed to be overlapped by an area in which a black matrix 232 to be described later is formed. The reflective layer 105 may be made of the same material as the above-described fine metal wires of the WGP 104.

A WGP insulating layer 120 is disposed on the WGP 104 and the reflective layer 105. The WGP insulating layer 120 prevents a gate electrode 121, etc. thereon from electrically contacting the WGP 104 made of metal and the reflective layer 105. The WGP insulating layer 120 may be made of an inorganic insulating material, such as a silicon nitride layer, a silicon oxide layer or a silicon oxynitride layer, or an organic insulating material.

The WGP insulating layer 120 may be patterned to partially expose a portion of the non-display area II of the first substrate 101 which is not overlapped by the second substrate 201. The FPCB 300 may be attached to the portion exposed by the WGP insulating layer 120.

A pad electrode 141 may be disposed on the portion of the first substrate 101 which is not covered with the WGP insulating layer 120. The FPCB 300 may be attached onto the pad electrode 141. The pad electrode 141 may be a gate pad, a data pad, or other pads which receive electrical signals from the FPCB 300. The pad electrode 141 may extend onto a sidewall of the WGP insulating layer 120 and an upper surface of the WGP insulating layer 120. A wiring line 140 connected to the pad electrode 141 may extend up to the display area I of the first substrate 101.

A gate line and the gate electrode 121 connected to the gate line are disposed on the WGP insulating layer 120. The gate line extends along a direction. The gate line extends across the display area I. The gate electrode 121 may branch from the gate line in the display area I. The gate line may extend up to the non-display area II and may be connected to the pad electrode 141, e.g., a gate pad electrode 141. in the non-display area II.

The gate line and the gate electrode 121 are covered by a gate insulating layer 122.

A semiconductor layer 123 may be disposed on the gate insulating layer 122. The semiconductor layer 123 overlaps the gate electrode 121. A source electrode 124 branching from a data line and a drain electrode 125 separated from the source electrode 124 may be disposed on the semiconductor layer 123. Although not illustrated in the drawing, an ohmic contact layer may be disposed between the source electrode 124, the drain electrode 124, and the semiconductor layer 123.

A passivation layer 126 may be disposed on the source electrode 124 and the drain electrode 125. The passivation layer 126 may be a type of insulating layer made of an insulating material such as a silicon nitride layer, a silicon oxide layer, or a silicon oxynitride layer. An organic layer 127 made of an organic material may be disposed on the passivation layer 126. The passivation layer 126 is optional.

The pixel electrode 128 made of a transparent conductive material may be disposed on the organic layer 127 in each pixel located in the display area I. The pixel electrode 128 may be electrically connected to the drain electrode 125 via a contact hole which penetrates the organic layer 127 and the passivation layer 126 to expose the drain electrode 125. The pixel electrode 128 may be made of indium tin oxide, indium zinc oxide, indium oxide, zinc oxide, tin oxide, gallium oxide, titanium oxide, aluminum, silver, platinum, chrome, molybdenum, tantalum, niobium, zinc, magnesium, or any alloy or stack thereof.

The second substrate 201 is placed to face the first substrate 101. The second substrate 201 may be a transparent insulating substrate made of glass or transparent plastic.

The black matrix 232 is disposed on the second substrate 201. A surface of the second substrate 201 on which the black matrix 232 is stacked faces the first substrate 101. The black matrix 232 may be disposed along boundaries of each pixel. Further, the black matrix 232 may extend up to the non-display area II of the second substrate 201.

The black matrix 232 is provided in the non-display area II of the second substrate 201 to block light unnecessary for the formation of an image. That is, the black matrix 232 prevents the leakage of light due to abnormal behavior of liquid crystal molecules at edges of an image display layer or prevents color mixing at edges of a color filter 233.

The color filter 233 may be disposed in each pixel located in the display area I of the second substrate 201. The color filter 233 may be a red, green or blue color filter. The color filter 233 may overlap the pixel electrode 128. The color filter 233 may be disposed on the black matrix 232 such that edges thereof partially overlap the black matrix 232.

An overcoating layer 231 may be disposed on the color filter 233 and the black matrix 232. The overcoating layer 231 may be formed up to the non-display area II of the second substrate 201.

A common electrode 230 may be disposed on the overcoating layer 231. The common electrode 230 may be made of indium tin oxide, indium zinc oxide, indium oxide, zinc oxide, tin oxide, gallium oxide, titanium oxide, aluminum, silver, platinum, chrome, molybdenum, tantalum, niobium, zinc, magnesium, or any alloy or stack thereof.

The common electrode 230 may cover the whole of the second substrate 201. The common electrode 230 may include slits (not shown) or openings (not shown) in the second substrate 201.

The first substrate 101 and the second substrate 201 are placed to face each other while maintaining a predetermined gap therebetween.

The liquid crystal layer 129 is interposed between the first substrate 101 and the second substrate 201. Although not illustrated in the drawing, an alignment layer may be formed on at least one of respective surfaces of the first substrate 101 and the second substrate 201 which contact the liquid crystal layer 129. The pixel electrode 128 of the first substrate 101 and the common electrode 230 of the second substrate 201 may be placed to face each other so as to form an electric field in the liquid crystal layer 129.

A sealing member 234 such as a sealant may be disposed between the first substrate 101 and the second substrate 201 in the non-display area II. The sealing member 234 is formed along the periphery of the display panel to surround the display panel. Therefore, the first substrate 101 and the second substrate 201 may be bonded together by the sealing member 234, and a predetermined space may be defined between the first substrate 101 and the second substrate 201. The liquid crystal layer 129 is disposed in the defined space, thereby preventing the outflow of the liquid crystal molecules.

The non-overlap area III of the first substrate 101 will now be described in greater detail.

Figure 4:
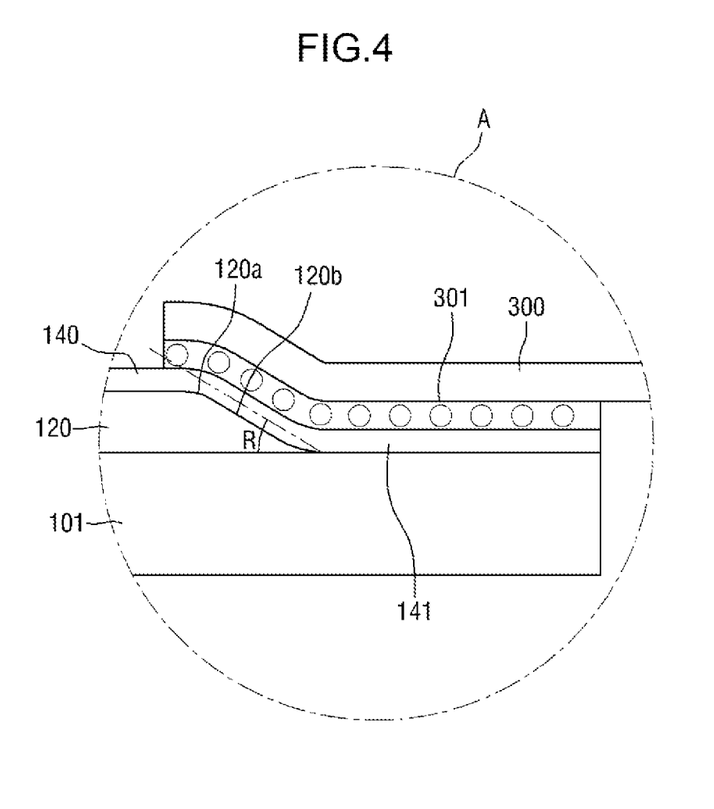
FIG. 4 is an enlarged view of a portion 'A' of FIG. 3.

FIG. 4 is an enlarged view of a portion 'A' of FIG. 3.

Referring to FIG. 4, the pad electrode 141 is disposed on a portion of the first substrate 101 which is exposed by the WGP insulating layer 120. The pad electrode 141 extends along a sidewall 120b of the WGP insulating layer 120.

A step portion 120a is defined around the sidewall 120b of the WGP insulating layer 120. The sidewall 120b of the WGP insulating layer 120 has a specific slope in the step portion 120a. An angle R of the sidewall 120b of the WGP insulating layer 120 to the first substrate 101, e.g., the upper surface thereof, may be in a range of 45 to 80 degrees. The angel R of 80 degrees or less may be suitable in reducing defects (such as breaking) of the pad electrode 141 due to a step difference. In addition, in this angle range, thermocompression bonding of an anisotropic conductive film 301 which will be described later can be performed easily.

The angle R of 45 degrees or more reduces a width of the exposed portion of the first substrate 101, thereby reducing a width of a bezel portion.

The FPCB 300 is disposed on the pad electrode 141. The anisotropic conductive film 301 may be interposed between the pad electrode 141 and the FPCB 300. The anisotropic conductive film 301 may electrically connect the FPCB 300 and the pad electrode 141 through thermo-compression bonding. The FPCB 300 may be electrically connected to further structures, e.g., a Printed Circuit Board, by another anisotropic conductive film 305, e.g., by thermocompression bonding.

A pad portion may include a data pad portion to which data lines are connected. In this case, data signal lines, e.g., one or more of the data lines, of the data pad portion may be formed not only on the WGP insulating layer 120 but also on the first substrate 101. That is, the data signal lines may be located on the first substrate 101 via the step portion 120a of the WGP insulating layer 120. Therefore, when connected to the first substrate 101, the FPCB 300 may contact not only the wiring line 140 formed on the WGP insulating layer 120 but also the pad electrode 141 formed on the first substrate 101 via the step portion 120a of the WGP insulating layer 120. This results in improved adhesion.

Figure 5:
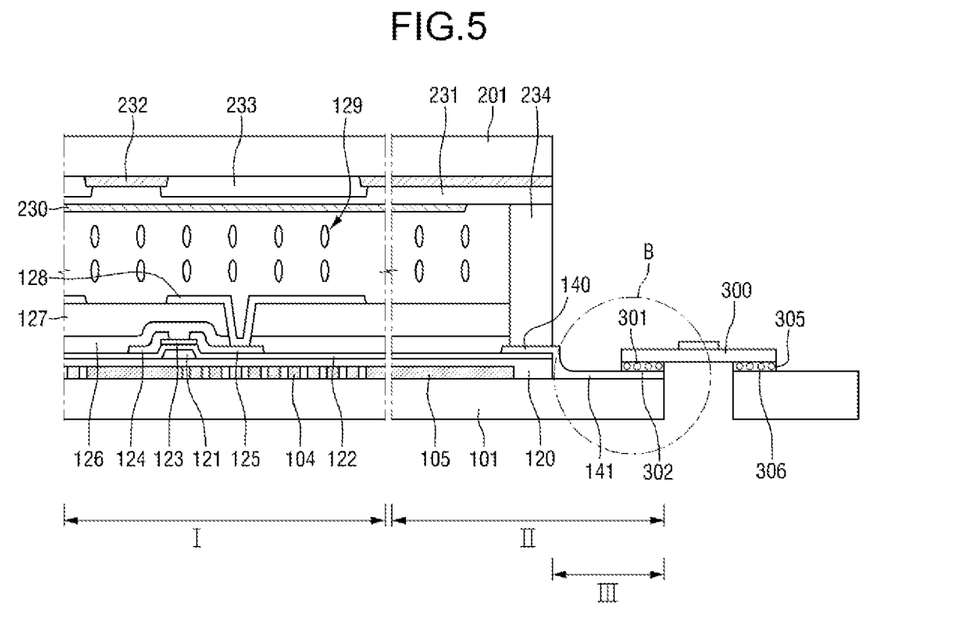
FIG. 5 is a cross-sectional view of a display panel of an LCD according to a second embodiment.
Figure 6:
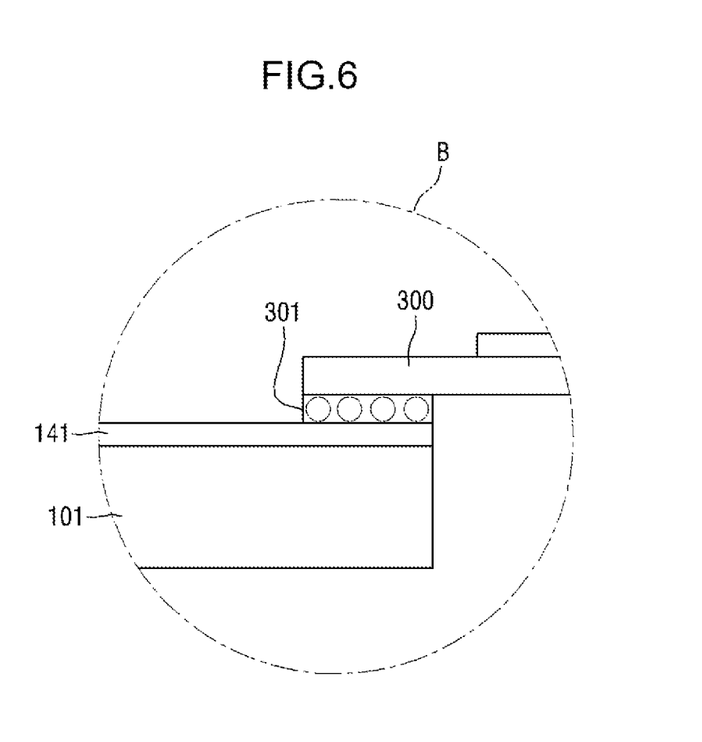
FIG. 6 is an enlarged view of a portion 'B' of FIG. 5.

FIG. 5 is a cross-sectional view of a display panel of an LCD according to a second embodiment. FIG. 6 is an enlarged view of a portion 'B' of FIG. 5.

Referring to FIGS. 5 and 6, the LCD according to the second embodiment is different from the LCD according to the first embodiment in that a WGP insulating layer 120 is not exposed on a pad portion while a pad electrode 141 is exposed and that an FPCB 300 is connected to the pad electrode 141. That is, the FPCB 300 may be connected to the pad electrode 141 while the pad portion is maintained flat in order to minimize wiring defects due to the step portion 120a disclosed in the first embodiment.

Figure 7:
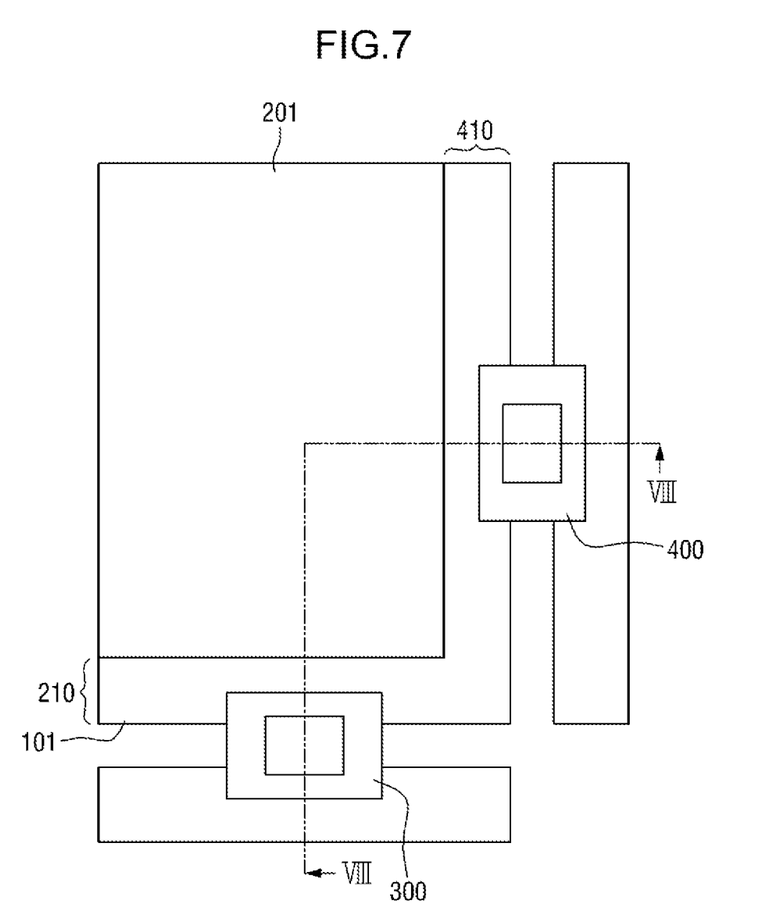
FIG. 7 is a plan view of a display panel of an LCD according to a third embodiment.
Figure 8:
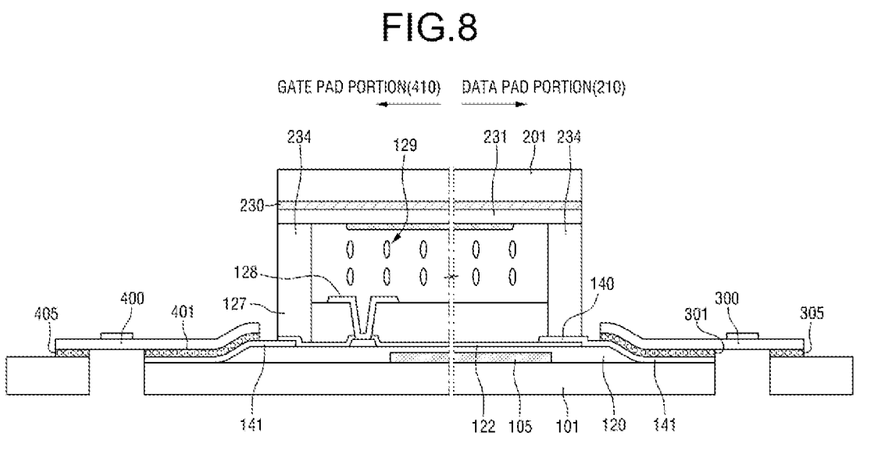
FIG. 8 is a cross-sectional view taken along the line of FIG. 7.

FIG. 7 is a plan view of a display panel of an LCD according to a third embodiment. FIG. 8 is a cross-sectional view taken along the line of FIG. 7. Referring to FIGS. 7 and 8, the LCD according to the third embodiment is different from the LCD according to the first embodiment in that it includes a data pad portion 210 connected to data lines and a gate pad portion 410 connected to gate lines and that data signal lines, e.g., one or more of the data lines, (not shown) of the data pad portion 210 and gate signal lines, e.g., one or more of the gate lines, (not shown) of the gate pad portion 410 are formed on a WGP insulating layer 120. That is, each of the gate and data signal lines is located on a first substrate 101 via a step portion 120a of the WGP insulating layer 120. Therefore, FPCBs 300 and 400 can be securely connected to the gate signal lines and the data signal lines disposed on a portion of the first substrate 101 exposed and uncovered by the WGP insulating layer 120. As in the first embodiment, the FPCBs 300 and 400 may be thermo-compression bonded to the data pad portion 210 and the gate pad portion 410 by anisotropic conductive films 301 and 401, and to further structures by anisotropic conductive films 305 and 405, respectively.

Embodiments provide at least one of the following features.

In an LCD according to embodiments, it is possible to prevent a wiring defect in a pad portion of a display panel having a WGP.

However, the effects of the inventive concept are not restricted to the one set forth herein. The above and other effects of the inventive concept will become more apparent to one of daily skill in the art to which the present application pertains by referencing the claims.

What is claimed is:
1. A liquid crystal display (LCD) comprising:
   a first substrate on which a gate electrode and a gate insulating layer disposed on the gate electrode are disposed;
   a second substrate which faces the first substrate;

a liquid crystal layer which is disposed between the first substrate and the second substrate;

a wire grid polarizer (WGP) which is disposed on the first substrate;

a WGP insulating layer which is disposed on the WGP and covers the WGP; and a pad electrode which is disposed on the first substrate, wherein the first substrate comprises a non-overlap area protruding from the second substrate, a sidewall of the WGP insulating layer is located in the non-overlap area, and the pad electrode extends from the non-overlap area of the first substrate along the sidewall of the WGP insulating layer, wherein the gate electrode is interposed between the gate insulating layer and the WGP insulating layer.

2. The LCD of claim 1, wherein the pad electrode further extends from the sidewall of the WGP insulating layer onto the WGP.

3. The LCD of claim 1, wherein each of the first substrate and the second substrate comprises a display area having a plurality of pixels and a non-display area located around the display area.

4. The LCD of claim 3, further comprising a reflective layer which is disposed on the first substrate, wherein the reflective layer is located on the same layer as the WGP.

5. The LCD of claim 4, wherein the WGP is located in the display area, and the reflective layer is located in the non-display area.

6. The LCD of claim 5, wherein the reflective layer is further located in the display area.

7. The LCD of claim 6, further comprising a black matrix and a color filter which are disposed on the second substrate, wherein the black matrix is disposed along boundaries of the pixels, the color filter is disposed in each of the pixels, and the reflective layer is overlapped by the black matrix in the display area.

8. The LCD of claim 1, wherein the pad electrode is located on the first substrate via a step portion of the WGP insulating layer.

9. The LCD of claim 8, wherein the step portion slopes at a predetermined angle.

10. The LCD of claim 8, wherein the step portion has an angle of 45 to 80 degrees to the first substrate.

11. The LCD of claim 1, further comprising a flexible printed circuit board (FPCB) connected to a pad portion, wherein the FPCB is thermo-compression bonded to the pad portion by an anisotropic conductive film disposed on the first substrate.

12. The LCD of claim 1, further comprising a flexible printed circuit board (FPCB) connected to a pad portion, wherein the FPCB is thermo-compression bonded by an anisotropic conductive film disposed on the first substrate.

13. The LCD of claim 1, wherein the second substrate comprises a display area configured to display an image and a non-display area excluding the display area, wherein the WGP is included in the display area.

14. The LCD of claim 13, wherein a reflective layer is formed in the non-display area.

15. The LCD of claim 14, wherein the reflective layer contains aluminum.

16. The LCD of claim 1, wherein the WGP is shaped like a plurality of stripes extending along a direction when the first substrate is seen in plan view.

17. The LCD of claim 1, wherein the WGP contains any one or more of aluminum, gold, silver, copper, chrome, iron, nickel, molybdenum, and alloys thereof.

18. The LCD of claim 1, wherein a pad portion comprises a gate pad portion connected to gate lines and a data pad portion connected to data lines, wherein gate signal lines of the gate pad portion and data signal lines of the data pad portion are formed not only on the WGP insulating layer but also on the first substrate.

19. The LCD of claim 18, wherein each of the gate signal lines and the data signal lines is located on the first substrate via a step portion of the WGP insulating layer.

20. The LCD of claim 18, further comprising a flexible printed circuit board (FPCB) which is connected to the gate signal lines and the data signal lines disposed on a portion of the first substrate exposed by the WGP insulating layer.

* * * * *